United States Patent Office 3,470,216
Patented Sept. 30, 1969

3,470,216
SELECTED 17,17-DIFLUORO UNSATURATED ANDROSTANES
George A. Boswell, Wilmington, Del., assignor to E. I. du Pont de Nemours and Company, Wilmington, Del., a corporation of Delaware
No Drawing. Continuation-in-part of application Ser. No. 444,454, Mar. 31, 1965. This application Nov. 29, 1966, Ser. No. 597,557
Int. Cl. C07c *169/18, 169/22;* A61k *27/00*
U.S. Cl. 260—397.3       5 Claims

ABSTRACT OF THE DISCLOSURE

Steroids of the formula

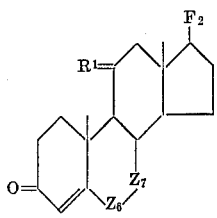

where $Z_6-Z_7$ represents —CH=CH—; —CHR$^2$—CH$_2$—; —CR$^2$=CH— where R$^2$ is Cl, Br or CH$_3$;

—CH$_2$—CHR$_3$— where R$_3$ is lower alkyl or thioacetyl; or

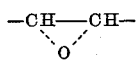

and R$^1$ is H,H; H,OH; or =O; and steroids of the formula

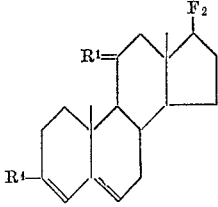

where R$_4$ is O-lower alkyl, O-cycloalkyl or O-lower alkanoyl. These steroids are prepared by a variety of procedures. For example, fluorination of a 3,17-dione derivative of the above-described steroids with sulfur tetrafluoride can result in the described steroids. The steroids have pharmaceutical properties.

CROSS REFERENCE TO RELATED APPLICATION

This application is a continuation-in-part of my copending application Ser. No. 444,454, filed Mar. 31, 1965.

FIELD OF THE INVENTION

This invention relates to certain new fluorine-substituted, ring-unsaturated steroids of the androstane series. More particularly, it relates to 17,17-difluoro steroids having an intracyclic double bond at the 4 or the 4 and the 6 carbon atoms of the ring. These new fluorinated steroids are characterized by unexpected and valuable biological propeties, including in particular antiandrogenic activity.

SUMMARY AND DETAILS OF THE INVENTION

The new compounds of this invention are 17,17-difluoro steroids represented by one of the formulas:

(1)

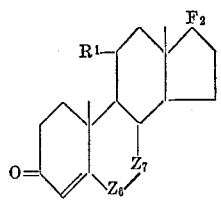

where R$^1$ represents (—H, —H), (—H, —OH) or (=OH) and the symbol $Z_6-Z_7$ represents the C–6 to C–7 grouping of the molecule selected from

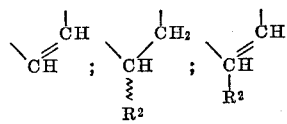

where R$^2$ is Cl, Br or CH$_3$;

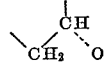

where R$^3$ is lower alkyl or thioacetyl; or

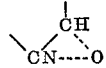

and
(2)

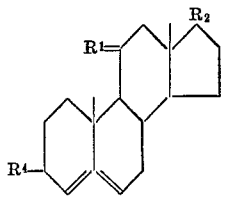

where R$^1$ is as defined above, and R$^4$ is (—O-lower alkyl), (—O-cycloalkyl of 5–6 carbon atoms) or (—O-lower alkanoyl).

In the above definition, "lower" is defined as containing up to 6 carbon atoms. Thus, lower alkanoyl is exemplified by formyl, acetyl, propionyl, butyryl, isobutyryl, or hexanoyl; "lower alkyl" is exemplified by methyl, ethyl, propyl, isopropyl, butyl or n-hexyl; and the "cycloalkyl" term represents cyclopentyl or cyclohexyl.

The products of this invention can be prepared by the various methods briefly described below and more fully illustrated in the examples which follow.

The compounds of Formula 1 can be prepared in various ways. Some of them, e.g., 17,17-difluoro-4,6-androstadiene-3-one or 17,17-difluoro-6α-methyl-4-androstene-3-one, may be prepared by fluorination with sulfur tetrafluoride of the corresponding 3,17-diones. In this reaction, the C–17 oxo group is replaced by two fluorine atoms but the conjugated 3-keto group, which is much less reactive, remains substantally unaffected under mild operating conditions, as does also the 11-keto group, if present. Compounds of Formula 1 having C–6 to C–7 unsaturation can also be prepared by oxidation with chloranil of the corresponding 17,17 - difluoro - 4 - androstene-3-one or -3,11-dione, whereby a double bond is formed at C–6.

The resulting 4,6-androstadienes in turn lead to the 7α-thioacetyl-4-androstenes by reaction with thiolacetic acid [cf. J. Org. Chem. 24, 1109 (1959)] and to the 7α-alkyl-4-androstenes by reaction with the requisite alkyl magnesium bromide and cuprous chloride [reactions of this type are described in J. Org. Chem. 26, 3077 (1961); J. Am. Chem. Soc. 81, 4069 (1959); and Steroids 1, 317 (1963)]. Some representative transformations of this kind are illustrated schematically in Diagram A below:

Diagram A

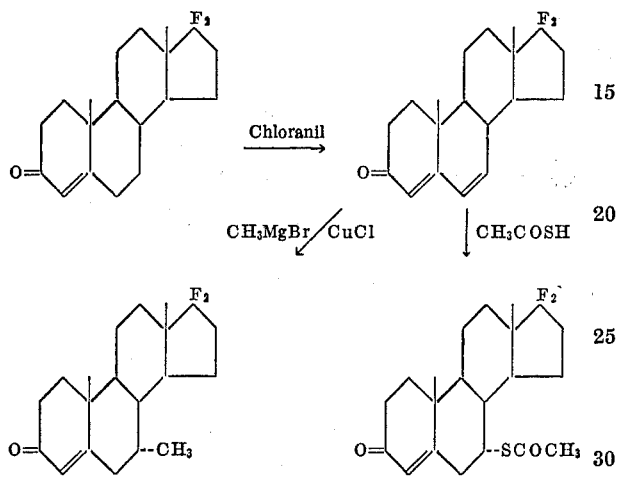

The 17,17-difluoro-4,6-androstadiene-3-ones of Formula 1 may also be prepared, generally in better yields, by an alternative route which consists in dehydrogenating a 4-androstene-3,17-dione by treatment with chloranil to form a 4,6-androstadiene-3,17-dione, which is then reacted with sulfur tetrafluoride to produce a 17,17-difluoro-4,6-androstadiene-3-one.

The 17,17-difluoro-6-halo-4-androstene-3-ones of Formula 1 are prepared by treatment with an N-halosuccinimide of the compounds of Formula 2, whose preparation will be described later. Thus, the 17,17-difluoro-6-bromo-4-androstene-3-ones are prepared by reaction of a 17,17-difluoro-3-acyloxy-3,5-androstadiene with N-bromosuccinimide [cf. J. Am. Chem. Soc. 82, 1230 (1960)]. The 17,17-difluoro-6-chloro-4-androstene-3-ones are prepared by reaction of a 3-alkoxy-17,17-difluoro-3,5-androstadiene with N-chlorosuccinimide, the initial product being a 6β-chloro compound, which can be isomerized in the presence of an acidic catalyst to the 6α-chloro compound. On dehydrogenation of a 17,17-difluoro-6-halo-4-androstene-3-one with chloranil, a 17,17-difluoro-6-halo-4,6-androstadiene-3-one is obtained [cf. J. Am. Chem. Soc. 81, 4107 (1959)]. Further, the 6-halo-4-androstene-3-one can be dehydrohalogenated by known methods, e.g., by treatment with calcium carbonate in a solvent such as dimethylformamide, with formation of a 6,7 double bond. Both reactions lead to compounds of Formula 1 These reactions are shown schematically in Diagram B below.

Diagram B

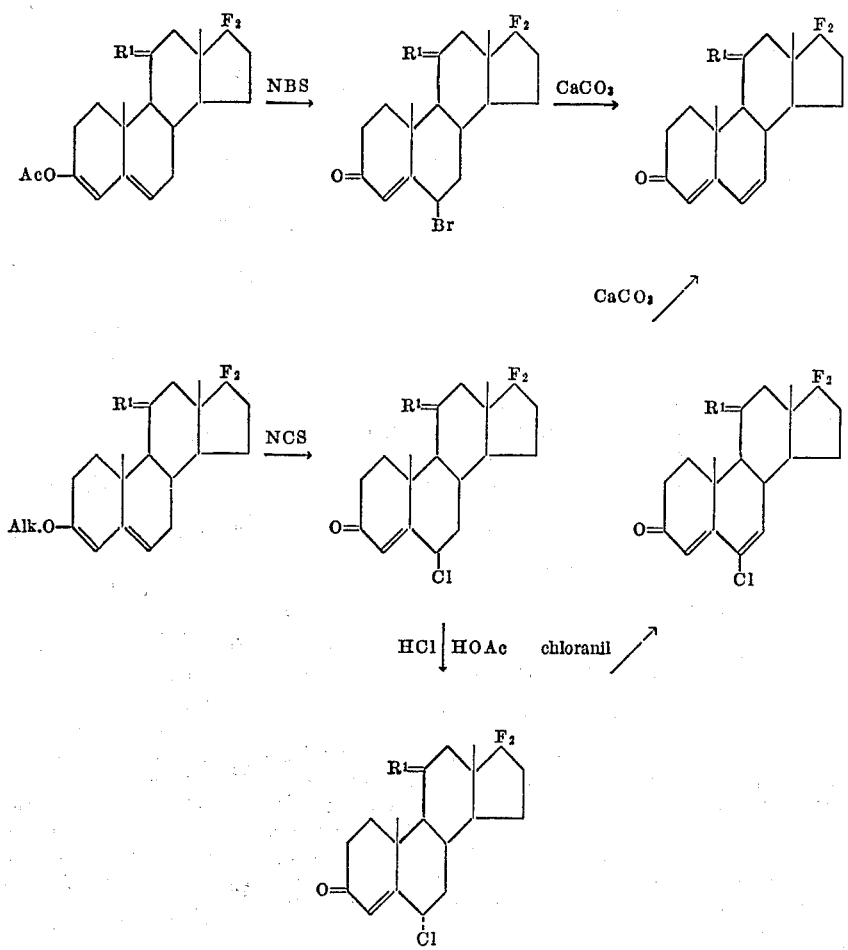

Compounds of Formula 1 having a 6α,7α-oxido group are made by treating the corresponding 17,17-difluoro-4,6-androstadiene-3-one with mono-perphthalic acid. The 6α,7α-oxido compounds can be converted, by treatment with hydrogen chloride or hydrogen bromide in glacial acetic acid, to the corresponding 6-chloro- or 6-bromo-17,17 - difluoro - 4,6 - androstadiene-3-one, presumably through intermediate formation of the 6,7-halohydrin and subsequent dehydration.

In the compounds of Formula 1, the 11-keto group, if present, can be reduced to the 11-hydroxy compound, e.g., by treatment with pyrrolidine to give the intermediate 3-pyrrolidinyl-3,5-androstadiene, followed by reduction of the 11-keto group with lithium aluminum hydride and mild acid hydrolysis to reform the 3-keto-4-androstene (cf. Djerassi, "Steroid Reactions," pp. 49–53).

Compounds of Formula 2 are prepared, in accordance with the known methods of converting a 3-keto-Δ⁴-steroid to the enol acetate, by treating a 17,17-difluoro-4-androstene-3-one, which may have an 11-keto group, either with isopropenyl acetate in the presence of an acidic catalyst (cf. Djerassi, "Steroid Reactions," 1963, pp. 37–42) or with acetyl chloride and acetic anhydride in pyridine (cf. Bull. Soc. Chim. 1957, 1289). Other 3-acyloxy-17,17-difluoro-3,5-androstadienes are prepared in the same manner, using the appropriate enol acylating agent. Compounds of Formula 2 having a 3-alkoxy group may be prepared similarly by known methods of enol etherification, e.g., by treatment with an alkyl orthoformate. Some of these reactions are shown in Diagram C below.

Diagram C

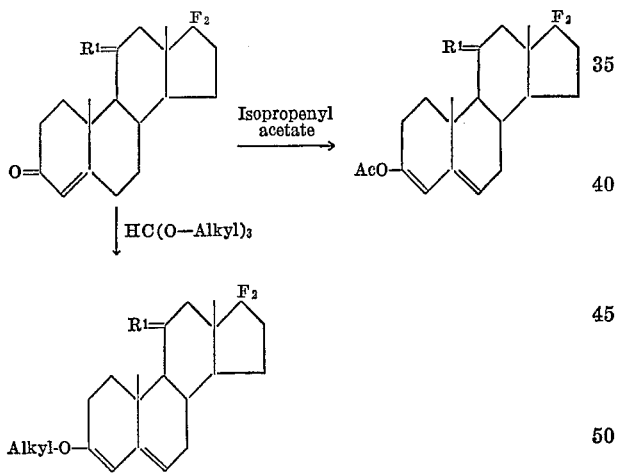

This invention is illustrated in greater detail in the following examples. In these examples, the melting points are reported as observed on a Kofler block and are uncorrected. The optical rotation determinations were made in chloroform (Chf.). The values given are followed by the letter c. and a number which indicates the concentration (grams of substance per 100 ml. of solvent).

EMBODIMENTS OF THE INVENTION

EXAMPLE 1.—17,17-difluoro-4,6-androstadiene-3-one

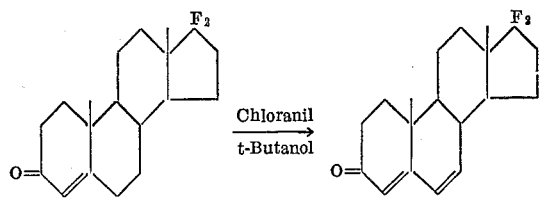

A solution of 17,17-difluoro-4-androstene-3-one (4.32 g.), recrystallized chloranil (3.8 g.) and redistilled t-butanol (75 ml.) was heated to reflux with stirring for 0.5 hour under nitrogen. The dark reaction mixture was concentrated under reduced pressure using a rotary evaporator. The residue was dissolved in methylene chloride and passed down a column of commercial chromatographic adsorbent. The methylene chloride eluates were then washed with cold 1 N NaOH solution (2×100 ml.), water, saturated NaCl solution and dried over $MgSO_4$. The solvent was removed under reduced pressure to leave a dark but crystalline residue which was further purified by chromatography on the same adsorbent (80 g.). Elution with hexane-methylene chloride (1:1) and methylene chloride returned the crystalline 17,17-difluoro-4,6-androstadiene-3-one, 2.26 g. This was recrystallized from methylene chloride-hexane to yield a head crop of 810 mg., M.P. 152–155° C. and 170–172° C., $[\alpha]_D^{23} + 83°$ (c. 2.11, Chf.). The analytical sample was sublimed, MP. 169–172° C.

Analysis.—Calcd. for $C_{19}H_{24}F_2O$: C, 74.48; H, 7.90; F, 12.45. Found: C, 74.68; H, 8.03; F, 12.40.

Infrared:

$\lambda_{max}^{Nujol}$ 6.0 (C-3 conj. C=O), 6.16 (C=C), 6.30 (C=C), and 8.55μ ($CF_2$)

Ultraviolet:

$$\lambda_{max}^{EtOH}\ 282m\mu\ (\epsilon = 23,800)$$

EXAMPLE 2

The product of Example 1 was prepared by the following reaction sequence:

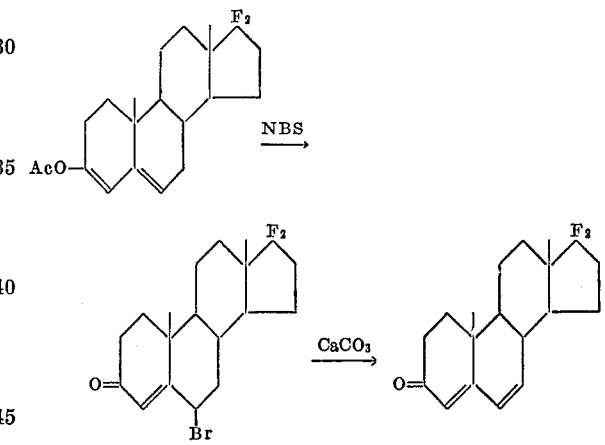

(A) 3-acetoxy-17,17-difluoro-3,5-androstadiene (9.43 g.; prepared as described in Example 8 below) was dissolved in acetone (376 ml.) containing sodium acetate (6.9 g.) dissolved in water (47.0 ml.), and the mixture was cooled to 0° C. N-bromosuccinimide (10.0 g.) was added and immediately followed by glacial acetic acid (7.9 ml.), and the mixture was stirred for 3 hours at 0–5° C. and then poured into water. The crude 6β-bromo-17,17-difluoro-4-androstene-3-one thus obtained was collected by filtration, thoroughly washed with water and air-dried, yield 9.5 g. Without further purification, this product was dehydrobrominated as described in Part B. The product can also be dehydrogenated by treatment with chloranil, as generally described in Examples 1 or 14, to give 6β-bromo-17,17-difluoro-4,6-androstadiene-3-one.

(B) A solution of the product of Part A in pure dimethylformamide (90 ml.) containing calcium carbonate (6.0 g.) was heated to reflux for 45 minutes under nitrogen and then filtered hot. The solid was washed well with ethyl acetate. The combined filtrate and washings were concentrated to about 90 ml. and the reaction product was precipitated by addition of water. The tan solid was collected by filtration, washed with water and air-dried, yield 6.7 g. The total crude product was taken up in hexane containing a trace of acetone and adsorbed onto a column of commercial chromatographic adsorbent (500 g.). Elution with hexane containing 10% acetone returned a crystalline solid, yield 7.5 g. This was recrystallized from acetone-hexane to give 17,17-difluoro-4,6-androstadiene-3-one, yield 6.2 g., M.P. 162-164° C. The infrared spectrum was identical to that of the product of Example 1.

EXAMPLE 3

The product of Example 1 was also prepared by a third method according to the following reaction sequence:

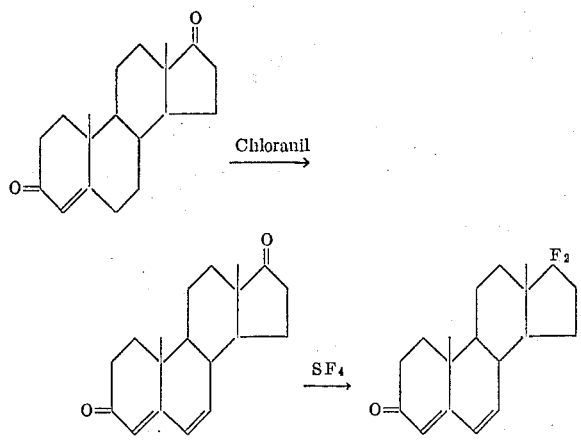

(A) A solution of 4-androstene-3,17-dione (4.32 g.), recrystallized chloranil (3.8 g.), and redistilled t-butanol (75 ml.) was heated to reflux under nitrogen for 0.5 hour, and then concentrated under reduced pressure to give a green syrup. This was dissolved in acetone-hexane and allowed to stand overnight at room temperature, which resulted in the formation of large crystals mixed with some oil. These were dissolved in ethyl acetate, the solution washed with 5% NaOH solution, water and saturated salt solution, and then dried over MgSO$_4$. Evaporation of the solvent under reduced pressure left a solid residue (2.33 g.), whose infrared spectrum showed it was 4,6-androstadiene-3,17-dione. This was further purified by chromatography followed by crystallization from acetone-hexane, yield 1.5 g. (1st crop), M.P. 165.5-168° C.

Infrared:

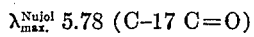

$\lambda_{max.}^{Nujol}$ 5.78 (C-17 C=O)

6.05 (conj. C-3 C=O), 6.22 ($\Delta^4$ C=O), 6.22 ($\Delta^4$ C=C), and 6.35$\mu$ ($\Delta^6$ C=C).

(B) A solution of 4,6-androstadiene-3,17-dione (7.5 g.) in methylene chloride (100 ml.) containing suspended water (1.5 ml.) was shaken with sulfur tetrafluoride (150 g.) at 20±2° C. for 30 hours. The reaction vessel was vented, swept out with a stream of nitrogen, and the contents transferred to a separatory funnel. The methylene chloride solution was washed with water, 5% sodium bicarbonate solution, water and saturated salt solution. After drying over magnesium sulfate, the solution was evaporated to dryness under reduced pressure to afford a dark syrup showing in the infrared:

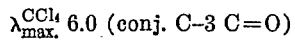

$\lambda_{max.}^{CCl_4}$ 6.0 (conj. C-3 C=O)

6.12 ($\Delta^4$ C=C), 6.25 ($\Delta^6$ C=C), and 8.55$\mu$ (CF$_2$). The C-17 C=O adsorption band at 5.78$\mu$ had essentially disappeared. The reaction product was thoroughly extracted with boiling hexane and the hexane extracts adsorbed onto a column of a magnesium silicate chromatographic adsorbent (450 g.). Elution with hexane containing 10% acetone brought the product off the column as a colorles crystalline solid. This was recrystallized from hexane-acetone to give 17,17-difluoro-4,6-androstadiene-3-one, yield 3.05 g. (1st crop) and 0.24 g. (2nd crop), M.P. 168° C. The infrared spectrum was identical to that of the material prepared as described in Example 1.

EXAMPLE.—17,17-difluoro-7α-methyl-4-androstene-3-one

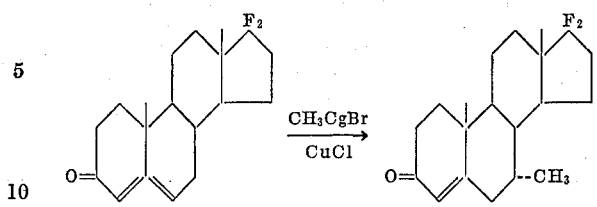

To a stirred solution of 17,17-difluoro-4,6-androstadiene-3-one (4.10 g.) and dry tetrahydrofuran (75 ml.) containing cuprous chloride (150 mg.) cooled in an ice bath and under nitrogen, there was added over five minutes a solution of commercial 3M methyl magnesium bromide (13 ml.) containing suspended cuprous chloride (150 mg.) and dry tetrahydrofuran (75 ml.). The resultant mixture was stirred an additional 5 minutes after which it was poured into a slurry of ice containing concentrated hydrochloric acid (30 ml.). The product was isolated by thoroughly extracting with methylene chloride. The extracts were washed with water, 5% NaHCO$_3$ solution, water and saturated salt solution. After drying over MgSO$_4$ the solution was concentrated under reduced pressure to give a yellow gum. The infrared spectrum indicated that the dienone had been converted to the desired enone. The total crude product was extracted with boiling hexane, and the cooled hexane extracts placed on a column of neutral alumina (200 g., activity III). Elution with hexane returned a little gum. Further elution with hexane-benzene (1:1) returned a yellow oil which solidified when triturated with methanol. The crystalline cuts were combined and recrystallized twice from methanol to give 17,17-difluoro-7α-methyl-4-androstene-3-one as colorless plates (768 mg., 1st crop), M.P. 176.5-178° C. The mother liquors yielded an additional 255 mg. of product. The analytical sample was sublimed, $[\alpha]_D^{23}$+95° (c. 2.43, Chf.).

*Analysis.*—Calcd. for C$_{20}$H$_{28}$F$_2$O: C, 74.50; H, 8.75; F, 11.75. Found: C, 74.49; H, 8.65; F, 11.63.

Infrared:

$\lambda_{max.}^{KBr}$ 5.98 (C-3 conj. C=O), 6.15 (conj. C=C) and 8.58$\mu$ (CF$_2$)

Ultraviolet:

$\lambda_{max.}^{EtOH}$ 239 m$\mu$ ($\epsilon$=16,800)

The same procedure can be applied to other magnesium alkyl halides, preferably bromides or iodides, to give other 7α-alkyl steroids of the same structure, for example, the 17,17-difluoro-4-androstene-3-ones having an ethyl, propyl, isopropyl, butyl or n-hexyl group on the 7-carbon atom.

EXAMPLE 5.—17,17-difluoro-7α-thioacetyl-4-androstene-3-one

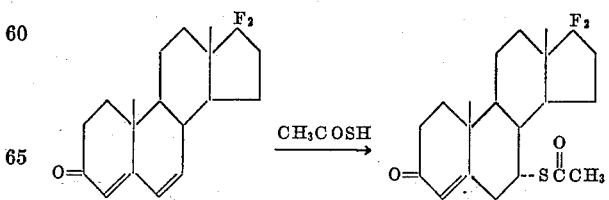

A solution of 17,17-difluoro-4,6-androstadiene-3-one (4.8 g.) in freshly distilled thiolacetic acid (50 ml.) was heated to reflux for 18 hours. The solvent was removed under reduced pressure and the oily residue was crystallized from acetone-hexane to give 3.6 g. of crude product. This was recrystallized from acetone-hexane to give pure 17,17 - difluoro - 7α - thioacetyl - 4 - androstene - 3 - one (3.07 g.), M.P. 172-174° C.

*Analysis.*—Calcd. for $C_4H_{28}F_2O_2$: C, 66.00; H, 7.38; F, 9.92; S, 8.37. Found: C, 66.10; H, 7.47; F, 10.31; S, 8.98.

Infrared:

$\lambda_{max.}^{Nujol}$ 5.87 (—S$\overset{\overset{O}{\|}}{C}$CH$_3$), 6.03 (C–3 conj. C=O), 6.18, (C=C), and 8.06$\mu$ (CF$_2$)

Ultraviolet:

$\lambda_{max.}^{EtOH}$ 237 ($\epsilon$=20,000) and 307 m$\mu$ ($\epsilon$=567)

Starting with 17,17-difluoro-4,6-androstadiene-3,11-dione (the product of Example 6 below), 17,17-difluoro-7$\alpha$-thioacetyl-4-androstene-3,11-dione is obtained in the same manner, and 17,17-difluoro-11$\beta$-hydroxy-7$\alpha$-thioacetyl-4-androstene-3-one is also obtained similarly, starting with 17,17-difluoro-11$\beta$-hydroxy-4,6-androstadiene-3-one (see Example 6 below).

EXAMPLE 6.—17,17-difluoro-4,6-androstadiene-3,11-dione

This compound was prepared from 3-acetoxy-17,17-difluoro-3,5-androstadiene-11-one (the product of Example 10 below) by the following reaction sequence:

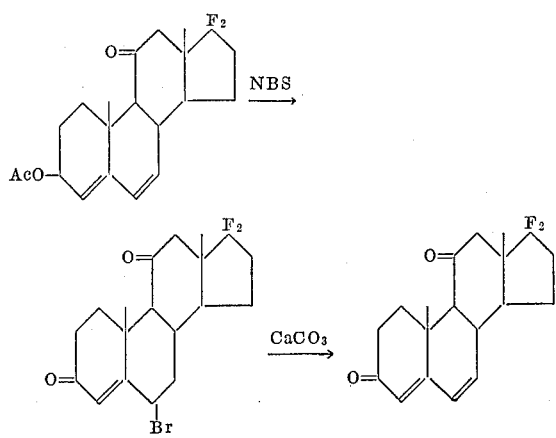

(A) 3 - acetoxy - 17,17 - difluoro - 3,5 - androstadiene-11-one (3.25 g.) was converted to 6$\beta$-bromo-17,17-difluoro-4-androstene-3,11-dione by treatment with N-bromosuccinimide, using the procedure described in Example 2-A.

(B) The product obtained in Part A, without further purification, was dehydrobromoinated by treatment with calcium carbonate in dimethylformamide as described in Example 2-B, and isolated by the same chromatographic procedure. The crystalline chromatography fractions were combined and recrystallized from hexane-acetone to give pure 17,17-difluoro-4,6-androstadiene-3,11-dione (1.63 g., 1st crop), M.P. 156–157° C. [$\alpha$]$_D^{23}$+306° (c. 2.14, Chf.).

*Analysis.*—Calcd. for $C_{19}H_{22}F_2O_2$: C, 71.30; H, 6.91; F, 11.85. Found: C, 71.59; H, 7.11; F, 11.62.

Infrared:

$\lambda_{max.}^{Nujol}$ 5.85 (C–11 C=O), 5.99 (C–3 C=O), 6.20 (C=C), 5.32 (C=C), and 8.58$\mu$ (CF$_2$)

Ultraviolet:

$\lambda_{max.}^{EtOH}$ 278 m$\mu$ ($\epsilon$=24,500)

The 6-bromo-17,17-difluorfo-4-androstene-3,11-dione of this example can be converted to 6-bromo-17,17-difluoro-11$\beta$-hydroxy-4-androstene-3-one by the lithium aluminum hydride reduction method discussed earlier. The later can then be dehydrohalogenated as described above to give 17,17 - difluoro - 11$\beta$ - hydroxy - 4,6 - androstadiene - 3-one.

EXAMPLE 7.—17,17-difluoro-7$\alpha$-methyl-4-androstene-3,11-dione

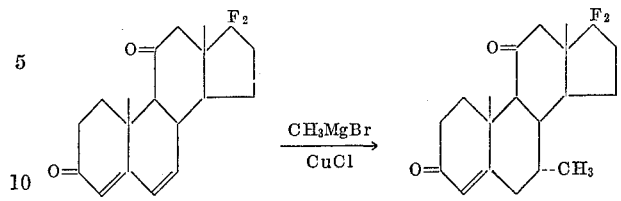

17,17 - difluoro - 4,6 - androstadiene - 3,11 - dione (5.85 g.) was allowed to react with methyl magnesium bromide in the presence of cuprous chloride, using the procedure described in Example 4. The crude product was purified by chromatography on neutral alumina (activity III) and recrystallization from acetone-hexane to give 17,17 - difluoro - 7$\alpha$ - methyl - 4 - androstene - 3,11 - dione (3.21 g.), M.P. 196–198.5° C., [$\alpha$]$_D^{23}$+195° (c. 2.21, Chf.).

*Analysis.*—Calcd. for $C_{20}H_{26}F_2O_2$: C, 71.80; H, 7.78; F, 11.25. Found: C, 71.49; H, 7.93; F, 11.30.

Infrared:

$\lambda_{max.}^{Nujol}$ 5.88 (C–11, C=O), 6.04 (conj. C–3 C=O), 6.22 (C=C, $\Delta^4$), and 8.56$\mu$ (CF$_2$)

Ultraviolet:

$\lambda_{max.}^{EtOH}$ 237 m$\mu$ ($\epsilon$=15,200)

Other 7$\alpha$-alkyl steroids of the same structure, e.g., 17,17 - difluoro - 7$\alpha$ - propyl - 4 - androstene - 3,11 - dione, the corresponding 7$\alpha$-n-pentyl derivative and the like, can be prepared by the same method, using the appropriate alkly magnesium bromide. These compounds can be converted to the corresponding 11-hydroxy steroids by the already mentioned method of lithium aluminum hydride reduction.

EXAMPLE 8.—3-acetoxy-17,17-difluoro-3,5-androstadiene

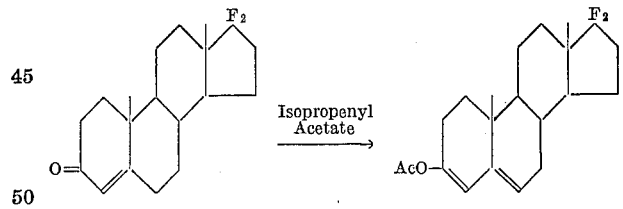

A solution of 17,17-difluoro-4-androstene-3-one (5.0 g.), p-toluenesulfonic acid (0.5 g.) and freshly distilled isopropenyl acetate (100 ml.) was heated to reflux for 24 hours. Twice during this period a few milliliters of volatile material was allowed to distill from the reaction mixture. The reaction mixture was cooled and solid sodium bicarbonate was added with stirring. The solvents were removed under reduced pressure using a rotary evaporator. The residue was extracted with methylene chloride and the extract was washed with water followed by saturated salt solution. After drying over MgSO$_4$ the solvent was evaporated and the residual crystalline solid was recrystallized from methanol to give 3-acetoxy-17,17-difluoro-3,5-androstadiene as colorless needles, M.P. 97–101° C., [$\alpha$]$_D^{23}$—115° (c. 1.95, Chf.).

*Analysis.*—Calcd. for $C_{21}H_{28}F_2O_2$: C, 72.00; H, 8.05; F, 10.82. Found: C, 71.94; H, 8.03; F, 10.28.

Infrared:

$\lambda_{max.}^{Nujol}$ 5.70 and 8.25 (OAc), 6.0 and 6.10 (C=C) and 8.56$\mu$ (CF$_2$)

Ultraviolet:

$\lambda_{max.}^{EtOH}$ 235 m$\mu$ ($\epsilon$=19,000)

EXAMPLE 9

The compound of Example 8 was also prepared by two other methods using acetic anhydride as the enol acetylation agent.

(A) *Using acetic anhydride and acetyl chloride.*—A solution of 17,17-difluoro-4-androstene-3-one (21.6 g.), redistilled acetic anhydride (450 ml.), acetyl chloride (176 ml.) and pyridine (17.6 ml.) was heated to reflux for 2 hours after which the reaction mixtures was cooled in an ice bath. The precipitated product was collected by filtration. The mother liquors were concentrated under reduced pressure. The resultant solid mass was triturated with cold methanol, filtered and air-dried. The combined solids were recrystallized from methanol to yield 17.9 g. of 3-acetoxy-17,17-difluoro-3,5-androstadiene.

(B) *Using acetic anyhdride and p-toluenesulfonic acid.*—A solution of 17,17-difluoro-4-androstene-3-one (5.0 g.) in redistilled acetic anhydride (50 ml.) containing p-toluenesulfonic acid (0.4 g.) was stirred at 90° C. for 1 hour after which time it was poured into 1 liter of cold water. The reaction product was extracted with ether, the ether extracts washed with water and saturated sodium chloride solution, and dried over $MgSO_4$. Evaporation of the ether left a tan syrup which crystallized when triturated with methanol. The total crude solid was recrystallized from methanol to give 3-acetoxy-17,17-difluoro-3,5-androstadiene, yield 3.13 g., M.P. 100–101° C. (2nd crop, 0.2 g., with M.P. 95–97° C.).

Other 3-acyloxy steroids of the same structure, e.g., the 17,17-difluoro-3,5-androstadienes in which the 3-carbon atoms bears a propionyloxy, butyryloxy or n-pentanoyloxy substituent, can be prepared by the same procedure, using the appropriate carboxylic acid anhydride/carboxylic acid chloride mixture.

Either procedure A or B above can be applied to 17,17-difluoro-4-androstene-3,11-dione to give the 3-acyloxy-17,17-difluoro-3,5-androstadiene-11-ones.

EXAMPLE 10.—3-acetoxy-17,17-difluoro-3,5-androstadiene-11-one

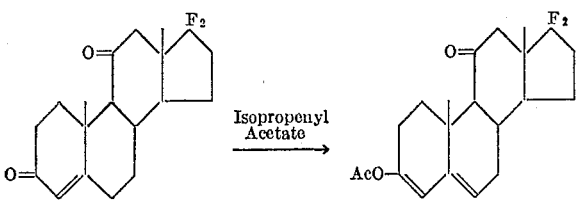

A solution of 17,17-difluoro-4-androstene-3,11-dione (5.0 g.) and freshly distilled isopropenyl acetate (100 ml.) containing p-toluenesulfonic acid (0.5 g.) was heated to reflux for 24 hours. Twice during this time the reflux condenser was removed and a few milliliters of solvent distilled. The reaction mixture was cooled and excess solid sodium bicarbonate added with stirring. The solvent was then evaporated on a rotary evaporator. The residue was extracted with boiling methylene chloride. The methylene chloride extracts were washed with water and saturated salt solution, dried over $MgSO_4$ and concentrated to a viscous syrup on a rotary evaporator. Trituration of the syrup with mehanol resulted in crystallization. The crude crystalline solid was recrystallized from methanol to afford 3-acetoxy-17,17-difluoro-3,5-androstadiene-11-one as colorless flat needles, yield 4.07 g., M.P. 159–166° C., $[\alpha]_D^{23}$ 140° (c. 2.24, Chf.).

*Analysis.*—Calcd. for $C_{21}H_{26}F_2O_3$: C, 69.20; H, 7.20; F, 10.40. Found: C, 69.13; H, 7.24; F, 10.18.

Infrared:

$\lambda_{max}^{Nujol}$ 5.75 (OAc), 5.89 (C–11 C=O), 6.03 (C=C), 6.13 (C=C), 8.20 (OAc), and 8.62$\mu$ (CF$_2$)

Ultraviolet:

$\lambda_{max}^{EtOH}$ 234m$\mu$ ($\epsilon$ = 16,800)

The starting material in this example, 17,17-difluoro-4-androstene-3,11-dione, may be prepared as described in U.S. Patent 3,257,424.

3-autoxy-17,17-difluoro-11$\beta$-hydroxy-3,5-androstadiene can be obtained in the same manner starting with 17,17-difluoro-11$\beta$-hydroxy-4-androstene-3-one. The latter is prepared by treatment of 17,17-difluoro-4-androstene-3,11-dione with pyrrolidine followed by lithium aluminum hydride reduction and regeneration of the 3-keto group.

EXAMPLE 11.—3-ethoxy-17,17-difluoro-3,5-androstadiene

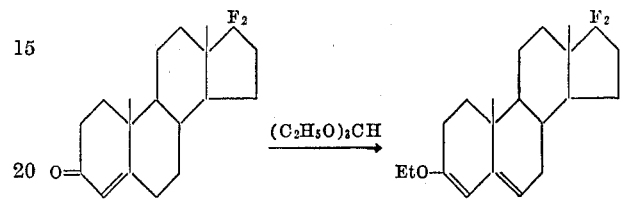

To a stirred solution of 17,17-difluoro-4-androstene-3-one (2.2 g.) and dry dioxane (11 ml.) containing p-toluenesulfonic acid (200 mg.) was added redistilled ethyl orthoformate (7.5 ml.). The resultant mixture was allowed to stir for 4.5 hours after which pyridine (5 ml.) was added. Water was added dropwise until the solution began to become cloudy. The product precipitated and was collected by filtration, washed with water and dried. The crude product was twice recrystallized from ether to give 3-ethoxy-17,17-difluoro-3,5-androstadiene (335 mg., 1st crop) as pale yellow prisms, M.P. 142–145° C., $[\alpha]_D^{23}$ −89° (c. 2.21, Chf.).

*Analysis.*—Calcd. for $C_{21}H_{30}F_2O$: C, 75.00; H, 8.98; F, 11.28. Found: C, 74.53; H, 8.59; F, 11.21.

Infrared:

$\lambda_{max}^{Nujol}$ 6.05 (C=C) 6.15 (C=C), and 8.55$\mu$ (CF$_2$)

Other 3-alkyloxy steroids of the same structure, e.g., the 17,17-difluoro-3,5-androstadienes having a methoxy, isopropoxy or cyclohexyloxy group, and the like, on the 3-carbon atom, can be prepared by the same procedure, using the appropriate alkyl orthoformate. The corresponding 3-alkyloxy- and 3-cycloalkyloxy-17,17-difluoro-3,5-androstadiene-11-ones are obtained in the same manner, starting with 17,17-difluoro-4-androstene-3,11-dione. These 3,11-dione products can then be transformed to the corresponding 3-alkoxy-17,17-difluoro - 11$\beta$-hydroxy-3,5-androstadienes through the lithium aluminum hydride sequence.

EXAMPLE 12.—6$\alpha$- and 6$\beta$-chloro-17,17-difluoro-4-androstene-3-one

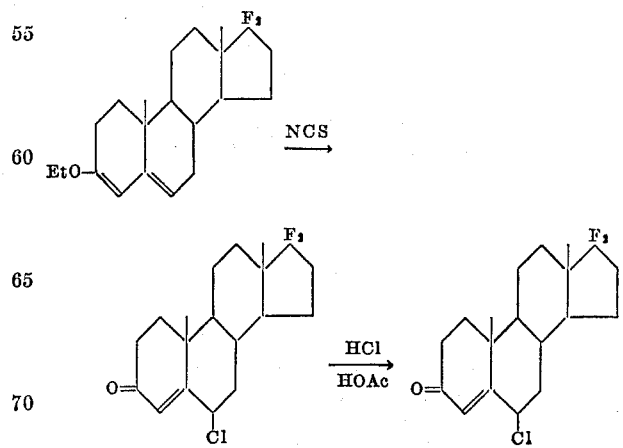

(A) To a stirred solution of 3-ethoxy-17,17-difluoro-3,5-androstadiene (5.38 g.) in acetone (180 ml.) was added sodium acetate (3.06 g.) in water (31 ml.) and the mixture was cooled to 0° C. N-chlorosuccinimide (2.96 g.) was added in one portion, followed immediately by the addition of glacial acetic acid (3.06 ml.). The resultant mixture was stirred for 2 hours at 0–5° C., then poured into ice water. The colorless precipitate which formed was collected by filtration, washed well with water and air-dried. This solid was recrystallized with hexane to give 6β-chloro - 17,17-difluoro-4-androstene-3-one (2.78 g. 1st crop, 0.53 g. 2nd crop) as crystals melting at 133–137° C. (capillary tube), $[\alpha]_D^{23} \pm 0°$ (c. 2.31, Chf.).

Analysis.—Calcd. for $C_{19}H_{25}ClF_2O$: C, 66.70; H, 7.33; Cl, 10.35; F, 11.10. Found: C, 66.76; H, 7.24; Cl, 9.87; F, 11.11.

Infrared:

$\lambda_{max.}^{Nujol}$ 5.95 (conj. C–3 C=O), 6.2 ($\Delta^4$ O=C), and 8.55μ ($CF_2$)

Ultraviolet:

$\lambda_{max.}^{EtOH}$ 237 ($\epsilon = 14{,}500$) and 332 mμ ($\epsilon = 51$)

6α- and 6β - chloro - 17,17-difluoro-4-androstene-3,11-dione are obtained in the same manner, starting with 3-ethoxy-17,17-difluoro-3,5-androstadiene-11-one. The 3,11-dione can be converted, through lithium aluminum hydride reduction as previously described, to the corresponding 3-keto-11β-hydroxy compound.

(B) A slow stream of hydrogen chloride was passed into a stirred solution of 6β-chloro-17,17-difluoro-4- androstene-3-one (2.44 g.) in glacial acetic acid (50 ml.) for 2 hours with the temperature being maintained between 15 and 20° C. The solution was then poured into water and the precipitate was collected by filtration, washed with water and air-dried. The solid was recrystallized from hexane-acetone to give 6α-chloro-17,17-difluoro-4-androstene-3-one (1.47 g.) as colorless needles, M.P. 162–164° C. dec. (capillary tube), $[\alpha]_D^{23} + 53°$ (c. 2.16, Chf.).

Infrared:

$\lambda_{max.}^{Nujol}$ 5.95 (conj. C–3 C=O), 6.19 ($\Delta^4$ C=C) and 8.55μ ($CF_2$)

Ultraviolet:

$\lambda_{max.}^{EtOH}$ 235 mμ ($\epsilon = 15{,}800$)

EXAMPLE 13.—3-cyclopentoxy-17,17-difluoro-3,5-androstadiene

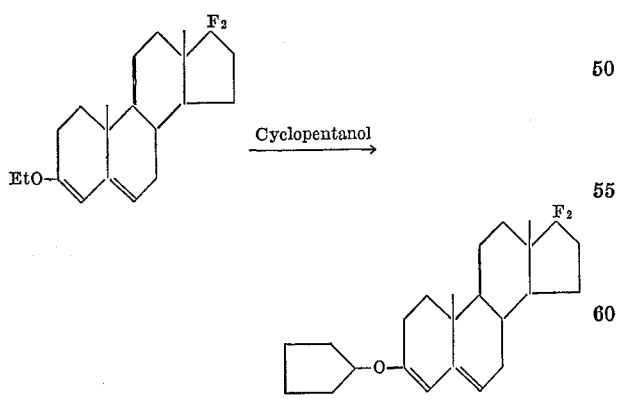

A mixture of dry benzene (120 ml.) and cyclopentanol (2.4 ml.) containing p-toluenesulfonic acid (30 mg.) was heated to reflux while allowing a few milliliters of liquid to distill from the mixture. After cooling 3-ethoxy-17,17-difluoro-3,5-androstadiene (1.0 g.) was added in one portion. The mixture was again heated to reflux and slow distillation was allowed to take place for 1 hour to remove the ethanol formed as the benzene-ethanol azeotrope. The residual solution was cooled, pyridine (5 ml.) was added, and the mixture was evaporated to dryness under reduced pressure. The crystalline residue was recrystalized from methanolether containing a few drops of pyridine to give 3-cyclopentoxy - 17,17-difluoro-3,5-androstadiene (0.794 g.) as long, colorless needles, M.P. 135–137° C.

Analysis. — Calcd. for $C_{24}H_{34}F_2O$: C, 76.56; H, 9.10; F, 10.09. Found: C, 76.01; H, 9.08; F, 10.00.

Infrared:

$\lambda_{max.}^{Nujol}$ 6.09 (C=C), 6.17 (C=C), and 8.55μ ($CF_2$)

EXAMPLE 14.—6-chloro-17,17-difluoro-4,6-androstadiene-3-one

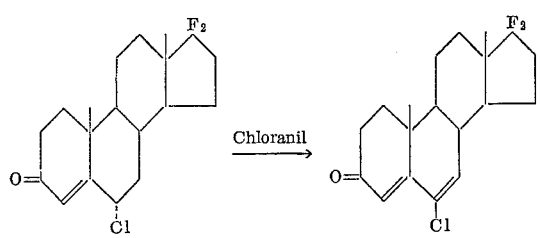

A solution of 6α-chloro-17,17-difluoro-4-androstene-3-one (4.15 g.), freshly recrystallized chloranil (8.0 g.) and n-amyl acetate (110 ml.) containing glacial acetic acid (22 ml.) was heated to reflux under nitrogen for 9 hours after which the dark reaction mixture was cooled and then filtered. The solid was rinsed well with ethyl acetate and the washings and original filtrate were combined and washed successively with water, 5% sodium hydroxide solution (2×100 ml.), water and saturated salt solution. After being dried over magnesium sulfate, the solution was evaporated under reduced pressure to leave a dark semisolid. The total crude product was dissolved in a small volume of hexane and adsorbed onto a column of neutral alumina (250 g., activity 3). A dark solid was eluted with hexane-benzene (3:1 and 1:1). The solid chromatographic fractions (ca. 1 g.) were combined and extracted thoroughly with boiling hexane. The hexane solution was cooled and then adsorbed onto a column of commercial chromatographic absorbent (80 g.). Elution with hexane containing 1.5% of acetone returned a nearly colorless solid. The solid cuts were combined and recrystallized from ether to give 6-chloro-17,17-difluoro-4,6-androstadiene-3-one as very small cubes. The mother liquors yielded additional solid which, after recrystallization from methanol and sublimation, melted at 159–162° C. (capillary tube).

Infrared:

$\lambda_{max.}^{Nujol}$ 6.03 (conj. C=O), 6.21 and 6.30 (conj. C=C and 8.55μ ($CF_2$)

Ultraviolet:

$\lambda_{max.}^{EtOH}$ 293 mμ ($\epsilon = 18{,}100$)

The same product was obtained in purer form by the method described in Example 17 below.

6 - chloro - 17,17-difluoro-4,6-androstadiene-3,11-dione can be obtained in the same manner, starting with 6α-chloro-17,17-difluoro-4-androstene-3,11-dione. This product can be reduced, as previously described, to the corresponding 3-keto-11β-hydroxy compound.

In a series of steps the same as described in the foregoing paragraph, 6 - bromo-17,17-difluoro-4,6-androstadiene-3,11-dione and 6-bromo-17,17-difluoro-11β-hydroxy-4,6-androstadiene-3-one can be prepared from 6α-bromo-17,17 - difluoro-4-androstene-3,11-dione. These products, however, are better obtained by treatment with hydrogen bromide of the corresponding 6α,7α-oxido compounds (see Example 16).

EXAMPLE 15.—17,17-difluoro-6α-methyl-4-androstene-3-one

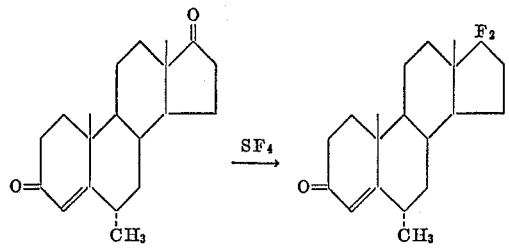

A solution of 6α-methyl-4-androstene-3,17-dione (2.5 g.) in methylene chloride (40 ml.) containing suspended water (1.5 ml.) was shaken with sulfur tetrafluoride (92 g.) at 20±2° C. for 16 hours. The reaction mixture was worked up essentially as described in Example 3–B to give a dark product whose infrared spectrum was in agreement with the desired structure. This material was extracted with boiling hexane containing 5% of acetone and the extract was adsorbed onto a column of a magnesium silicat chromatographic adsorbent (100 g.). Elution with hexane (five 100-ml. portions) returned a little sulfur. Continued elution with hexane fractions containing, successively, 3%, 3.5%, and 4% of acetone returned about 1.5 g. of material which was recrystallized from hexane-acetone to yield, as the first crop, 1.105 g. of 17,17-difluoro-6α-methyl-4-androstene-3-one, M.P. 157–157.5° C. $[\alpha]_D^{23}+80°$ (c. 2.07, Chf.). The analytical sample was sublimed.

*Analylsis.*—Calcd. for $C_{20}H_{28}F_2O$: C, 74.50; H, 8.75; F, 11.80. Found: C, 75.00; H, 8.89; F, 11.55.

Ultraviolet:

$$\lambda_{max.}^{EtOH}\ 238\ (\epsilon=14{,}700)\ \text{and}\ 288\ m\mu\ (\epsilon=185)$$

The starting material in this example, 6α-methyl-4-androstene-3,17-dione, may be prepared as described by Ringold et al. in J. Org. Chem. 22, 99 (1957).

The same procedure, when applied to 6α-methyl-4-androstene-3,11,17-trione (which may be prepared as described in U.S. Patent 2,842,572)) leads to 17,17-difluoro-6α-methyl-4-androstene-3,11-dione. Chloranil oxidation of this compound by the procedure of Examples 1 or 14 leads to 17,17-difluoro-6-methyl-4,6-androstadiene-3,11 - dione, and chloranil oxidation of 17,17-difluoro-6α-methyl - 4-androstene-3-one leads to 17,17-difluoro-6-methyl - 4,6-androstadiene-3-one.

Both 17,17-difluoro-6α-methyl-4-androstene-3,11 - dione and 17,17-difluoro-6-methyl-4,6-androstadiene-3,11 - dione can be converted through the lithium aluminum hydride sequence to 17,17-difluoro-11β-hydroxy-6α - methyl - 4-androstene-3-one and 17,17-difluoro-11β - hydroxy - 6-methyl-4,6-androstadiene-3-one, respectively.

EXAMPLE 16.—17,17-difluoro-6α,7α-oxido-4-androstene-3-one

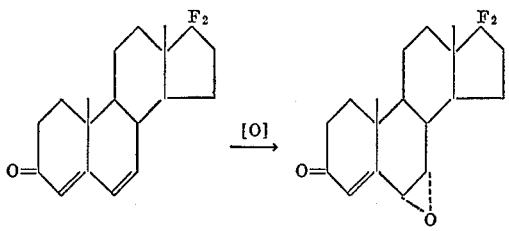

To a stirred solution of 17,17-difluoro-4,6-androstadiene-3-one (18.4 g.) in methylene chloride (900 ml.) cooled to 5° C. was added dropwise a solution of monoperphathalic acid in ether (950 ml. of 0.42 N solution). The reaction mixture was stirred at room temperature for 110 hours, during which time copious amounts of phthalic acid deposited. The mixture was then poured with stirring into one liter of saturated aqueous sodium carbonate solution. The organic layer was separated, washed with saturated sodium carbonate solution, water and saturated sodium chloride solution, dried over magnesium sulfate, and evaporated to a small volume on the steam bath. The solid which had precipitated was collected, washed with cold hexane containing a little ether and air-dried. There was thus obtained 6.4 g. of 17,17-difluoro-6α,7α-oxido-4-androstene-3-one, showing in the infrared $$\lambda_{max.}^{Nujol}\ \text{at}\ 5.90,\ 6.14,\ 8.6\ \text{and}\ 11.45\mu$$

Recrystallization from acetone-hexane afforded this product as colorless cubes (first crop, 3.34 g.; second crop, 1.16 g.; third crop, 0.495 g.). The first crop melted at 252–254° C. A portion of the first crop was recrystallized from acetone-hexane to give crystals melting at 253–255° C., $[\alpha]_D^{24}+52°$ (c. 1.95, Chf.), showing in the ultraviolet $$\lambda_{max.}^{EtOH}\ 238\ m\mu$$

The infrared spectra of the first and third crops were identical.

*Analysis.*—Calcd. for $C_{19}H_{24}F_2O_2$: C, 7.50; F, 11.75. Found: C, 70.55; H, 7.59; F, 11.78.

17,17-difluoro-6α,7α-oxido-4-androstene-3,11-dione and 17,17-difluoro-11β-hydroxy-6α,7α-oxido-4-androstene - 3-one can be obtained in the same manner, starting with 17,17-difluoro-4,6-androstadiene-3-11-one, respectively.

EXAMPLE 17.—6-chloro-17,17-difluoro-4,6-androstadiene-3-one

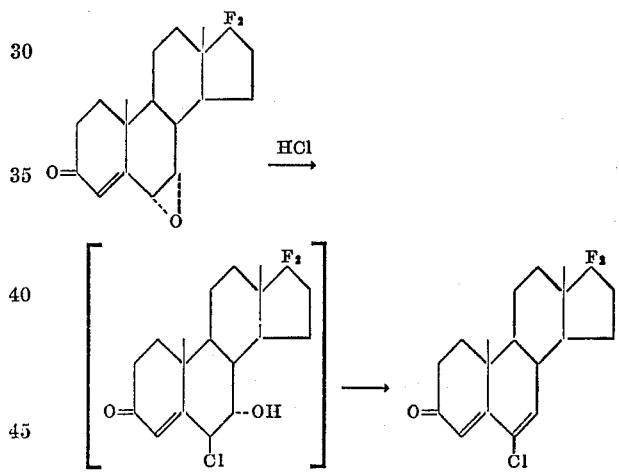

A stirred suspension of 17,17-difluoro-6α,7α-oxido-4-androstene-3-one (4.63 g.) in glacial acetic acid (60 ml.) was saturated with a slow stream of hydrogen chloride for 3 hours with the temperature being maintained at 20–25° C. During this time the suspended solid dissolved to give a clear solution, followed by precipitation of a white solid which, in turn, redissolved to give at the end of the three hours a clear tan solution which was kept at room temperature for 12 hours. The product was precipitated with ice water to yield 4.46 g. of 6-chloro-17,17-difluoro-4,6-androstadiene-3-one, M.P. 174–177° C., showing in the infrared $$\lambda_{max.}^{CCl_4}\ 5.95$$

chromatography on neutral alumina (150 g., activity III). Elution with hexane-benzene (1:1) returned a crystalline material which was recrystallized from acetone-hexane to afford the product as thick yellow needles, M.P. 178–180° C. The analytical sample, after recrystallization from methylene chloride-methanol, showed M.P. 180–182° C., $[\alpha]_D^{23}+51°$ (c. 2.28, Chf.) and, in the ultraviolet, $$\lambda_{max.}^{EtOH}\ 284\ m\mu\ (\epsilon=20{,}800)$$

*Analysis.*—Calcd. for $C_{19}H_{23}ClF_2O$: C, 67.20; H, 6.79; Cl, 10.42; F, 11.15. Found: C, 67.36; H, 6.76; Cl, 10.62; F, 11.19.

The new 17,17-difluoro steroids of this invention have all shown anti-androgenic activity, as demonstrated by tests on male rats, with some being more effective than others in this respect. Anti-androgenic activity is shown by the fact that these compounds are able to inhibit the hormonal acion of simultaneously administered testosterone propionate in castrate male rats, and to inhibit endogenous androgen (mainly testosterone) in intact male rats. Furthermore, the tests indicate that these compounds block the androgenic (virilizing) action of testosterone without blocking the anabolic (myotrophic) action, and in fact exhibit a slight anabolic effect. The degree of androgeninhibition is determined by measuring the ability of the compound to block the testosterone propionate or testosterone-induced hypertrophy of the ventral prostate, seminal vesicle in the castrate male rat and to inhibit the normal growth of these glands in the immature intact male rat. The degree of anabolic effect is estimated on the basis of the gain in weight of the body and levator ani muscle.

As is known, anti-androgenic steroids are valuable agents in the therapeutic treatment of prostatic carcinoma in male mammals [see, for example, the article by Huggins in Cancer Research 16, 825 (1956)] and have been proposed in the treatment of other disorders such as post-puberal and idiopathic hirsutism in female mammals, and the Stein-Leventhal syndrome [see, for example, Sanders et al., Steroids 3, 687 (1964), listing leading references].

It was quite unexpected to find that the compounds of this invention possess anti-androgenic activity since certain previously known 17,17-difluoro steroids are reported to be androgenic, i.e., to possess the opposite activity (see, for example, U.S. Patent 3,163,661).

Some of the compounds of this invention, in particular those having an alkyl or thioacetyl substituent at the 7-position, also possess the advantageous property of being anti-gonadotrophic, i.e., of inhibiting pituitary secretions. This property indicates usefulness in the treatment of disorders, apparently connected with excessive gonadotrophin secretion, which often occur during menopause.

Additionally, some of the compounds of this invention, in particular those having alkyl or halogen at C-6 or alkyl at C-7, have shown anti-fertility properties in test animals. For example, 6α-chloro - 17,17 - difluoro-4-androstene - 3 - one, 17,17 - difluoro - 6α - methyl - 4-androstene - 3 - one and 17,17 - difluoro-7α-methyl-4-androstene-3-one effectively prevent implantation in female rats.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. The steroids represented by the formula

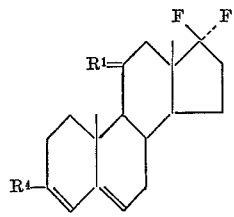

wherein $R^1$ is a group selected from the class consisting of (—H, —H), (—H, —OH) and (=O) and $R^4$ is a group selected from the class consisting of (—O-lower alkyl), (—O-cycloalkyl of 5–6 carbon atoms) and (—O-lower alkanoyl).

2. The steroid having the formula

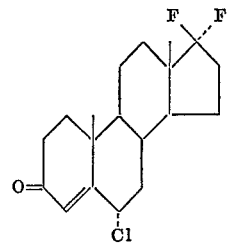

3. The steroid having the formula

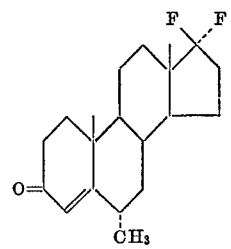

4. The steroid having the formula

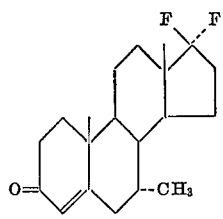

5. The steroid having the formula

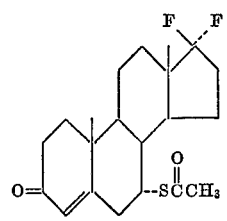

References Cited

UNITED STATES PATENTS

| | | | |
|---|---|---|---|
| 3,281,436 | 10/1966 | Tadanier et al. | 260—397 |
| 3,378,550 | 4/1968 | Boswell | 260—239.55 |

FOREIGN PATENTS 935,116  8/1963  Great Britain.

ELBERT L. ROBERTS, Primary Examiner

U.S. Cl. X.R.

260—239.55, 397.45, 397.5, 999, 397.5

PO-1050
(5/69)

UNITED STATES PATENT OFFICE
CERTIFICATE OF CORRECTION

Patent No. 3,470,216      Dated September 30, 1969

Inventor(s) George A. Boswell

It is certified that error appears in the above-identified patent and that said Letters Patent are hereby corrected as shown below:

Column 2, line 16, change "(=OH)" to read -- (=O) --;

Column 12, line 4, change "3-autoxy- " to read -- 3-acetoxy- --;

SIGNED AND
SEALED
FEB 24 1970

(SEAL)
Attest:

Edward M. Fletcher, Jr.
Attesting Officer

WILLIAM E. SCHUYLER, JR.
Commissioner of Patents